(12) United States Patent
Pontisakos et al.

(10) Patent No.: US 11,285,942 B2
(45) Date of Patent: Mar. 29, 2022

(54) COLLISION MITIGATION AND AVOIDANCE

(71) Applicant: Ford Global Technologies, LLC, Dearborn, MI (US)

(72) Inventors: Christopher Pontisakos, Allen Park, MI (US); Alex Maurice Miller, Canton, MI (US); Purushothaman Rayalsamy, Westland, MI (US); Yuhao Liu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 16/240,976

(22) Filed: Jan. 7, 2019

(65) Prior Publication Data

US 2020/0216060 A1     Jul. 9, 2020

(51) Int. Cl.
| | | |
|---|---|---|
| *B60W 30/09* | (2012.01) |
| *B60W 30/08* | (2012.01) |
| *B60W 10/20* | (2006.01) |
| *B60W 10/18* | (2012.01) |

(52) U.S. Cl.
CPC ............ *B60W 30/09* (2013.01); *B60W 10/18* (2013.01); *B60W 10/20* (2013.01); *B60W 30/08* (2013.01); *B60W 2400/00* (2013.01); *B60W 2554/00* (2020.02); *B60W 2710/18* (2013.01); *B60W 2710/20* (2013.01)

(58) Field of Classification Search
CPC ...... B60W 30/09; B60W 10/20; B60W 10/04; B60W 10/18; B60W 30/95; B60W 30/08; B60W 2554/00; B60W 2400/00; B60W 2710/18; B60W 2710/20; G08G 1/09; G08G 1/16; B60T 7/22; B60T 8/171; B60T 8/172; B60T 7/12; G06T 7/269; G06F 17/10; B60R 21/00; B60R 21/136; B60R 21/16

See application file for complete search history.

(56) References Cited

U.S. PATENT DOCUMENTS

| | | |
|---|---|---|
| 8,706,393 B2 | 4/2014 | Miller et al. |
| 9,650,025 B2 | 5/2017 | Dagan |
| 9,886,856 B2 | 2/2018 | Dougherty |
| 10,011,277 B2 | 7/2018 | Meinhart et al. |

(Continued)

FOREIGN PATENT DOCUMENTS

JP     2014051196 A     3/2014

OTHER PUBLICATIONS

Gabriel R. de Campos et al., Collision avoidance at intersections: A probabilistic threat-assessment and decision-making system for safety interventions, Oct. 8-11, 2014, (Year: 2014).*

*Primary Examiner* — Jess Whittington
*Assistant Examiner* — Terry C Buse
(74) *Attorney, Agent, or Firm* — Frank A. MacKenzie; Bejin Bieneman PLC

(57) ABSTRACT

A system includes a computer including a processor and a memory, the memory storing instructions executable by the processor to, upon determining a front threat number exceeds a threat threshold, determine a rear time to collision between a turning host vehicle and a target, and, upon determining that the rear time to collision is below a time threshold, actuate a component based on a rear threat number for the target.

17 Claims, 7 Drawing Sheets

(56) References Cited

U.S. PATENT DOCUMENTS

| | | | |
|---|---|---|---|
| 2004/0193347 A1* | 9/2004 | Harumoto | G08G 1/167 |
| | | | 701/45 |
| 2010/0222960 A1* | 9/2010 | Oida | B60N 2/501 |
| | | | 701/31.4 |
| 2016/0362104 A1* | 12/2016 | Miller | B60W 30/08 |
| 2017/0300049 A1* | 10/2017 | Seally | G06Q 10/047 |
| 2018/0043887 A1* | 2/2018 | Newman | B60W 10/04 |
| 2018/0208186 A1 | 7/2018 | Liu et al. | |

* cited by examiner

COLLISION MITIGATION AND AVOIDANCE

BACKGROUND

Vehicle collisions often occur at intersections. Collision mitigation between a host vehicle and a target may be difficult and expensive to implement. For example, determining a threat assessment for the target may use limited or inaccurate data to assign excessive risk to a scenario that in fact may not require avoidance or mitigation. Furthermore, performing the threat assessment may result in positive identifications of threat that may not require mitigation, which can be operationally costly for a vehicle computer and vehicle components, increasing processing cycles of the vehicle computer to perform the threat assessment and actuate the vehicle components.

DETAILED DESCRIPTION

Figure 1:
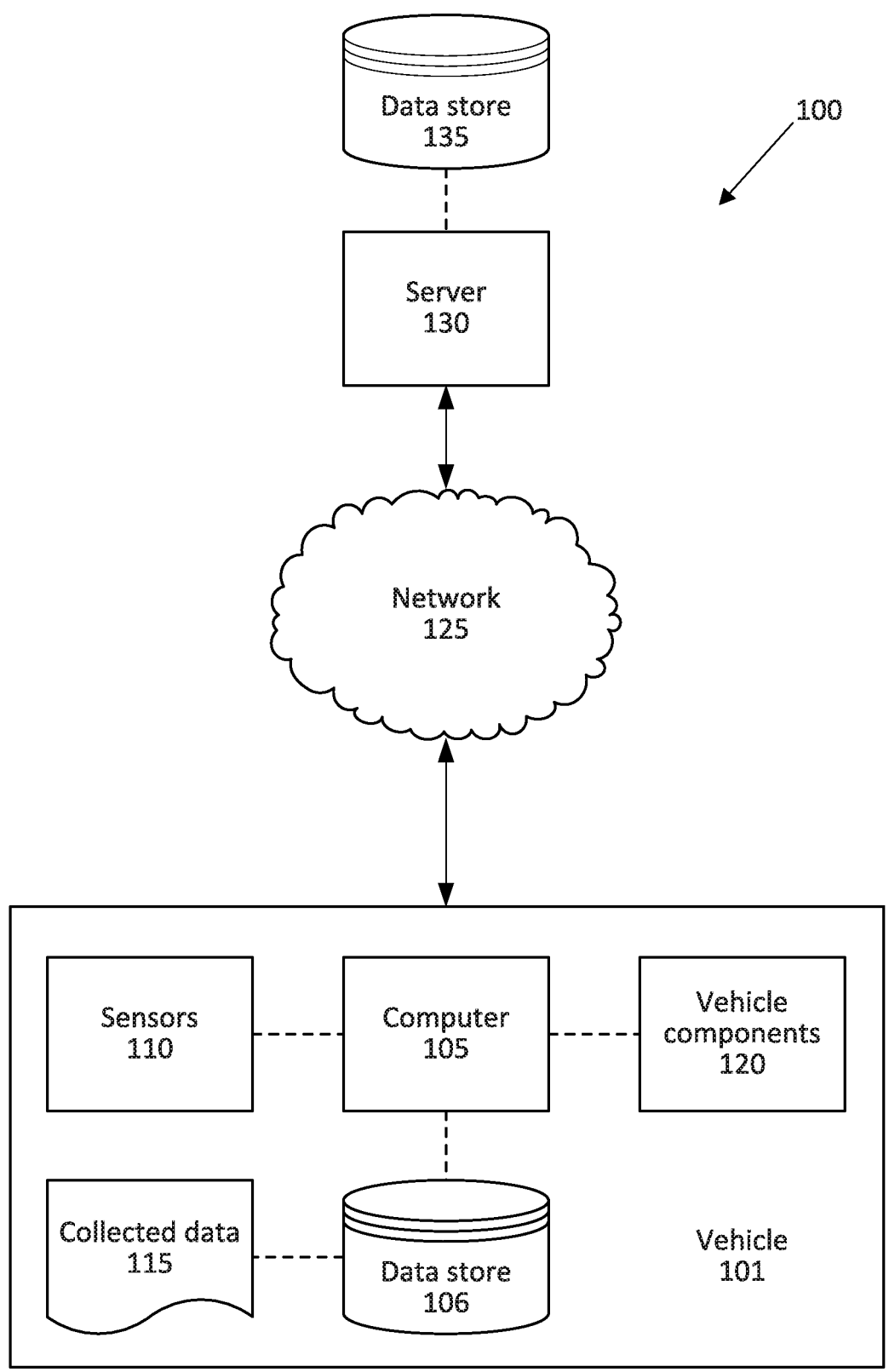
FIG. 1 is a block diagram of an example system for operating a vehicle in an intersection.

A system includes a computer including a processor and a memory, the memory storing instructions executable by the processor to, upon determining a front threat number exceeds a threat threshold, determine a rear time to collision between a turning host vehicle and a target, and, upon determining that the rear time to collision is below a time threshold, actuate a component based on a rear threat number for the target.

The instructions can further include instructions to determine an overall threat number based on the rear threat number and the front threat number.

The overall threat number can be based on a threat multiplier that is based on the rear threat number.

The instructions can further include instructions to set the threat multiplier to zero when the rear threat number is below a rear threat threshold.

The instructions can further include instructions to determine the front threat number based on a front point of the target and the rear threat number based on a rear point of the target.

The instructions can further include instructions to determine the rear threat number when a predicted lateral distance from the host vehicle to a rear corner of the target is below a distance threshold.

The instructions can further include instructions to determine the rear time to collision when the front threat number exceeds the threat threshold for a first time in a turn.

The rear threat number can be a brake threat number.

The instructions can further include instructions to actuate a steering component to complete a turn when the rear threat number is below a rear threat threshold.

The instructions can further include instructions to determine the rear time to collision based on a predicted rear longitudinal distance.

A method includes, upon determining a front threat number exceeds a threat threshold, determining a rear time to collision between a turning host vehicle and a target, and, upon determining that the rear time to collision is below a time threshold, actuating a component based on a rear threat number for the target.

The method can further include determining a threat multiplier based on the rear threat number.

The method can further include setting the threat multiplier to 0 when the rear threat number is below a rear threat threshold.

The method can further include determining the front threat number based on a front point of the target and the rear threat number based on a rear point of the target.

The method can further include determining the rear time to collision when the front threat number exceeds the threat threshold for a first time in a turn.

A system includes a brake, a steering component, means for determining a rear time to collision between a turning host vehicle and a target upon determining a front threat number exceeds a threat threshold, and means for upon actuating one of the brake or the steering component based on a rear threat number for the target upon determining that the rear time to collision is below a time threshold.

The system can further include means for determining a threat multiplier based on the rear threat number.

The system can further include means for setting the threat multiplier to 0 when the rear threat number is below a rear threat threshold.

The system can further include means for determining the front threat number based on a front point of the target and the rear threat number based on a rear point of the target.

The system can further include means for determining the rear time to collision when the front threat number exceeds the threat threshold for a first time in a turn.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Determining a time to collision, a lateral distance, and a threat number based on a rear point of a target provides collision avoidance and mitigation for front impacts, side impacts, and false positives for a turning host vehicle. The computer in the vehicle can provide braking during front-front impacts in an OnComing Turn Across Path (OCTAP) scenario and during front-side impacts during an OCTAP scenario. The computer in the vehicle can prevent braking during "near miss" scenarios, i.e., false positive indications of a collision based on a front point and a rear point of the target where the vehicle will pass by the rear end of the target during the turn. Thus, the computer provides braking functionality for different host front impact OCTAP scenarios and utilizes multiple points of information about the target to more accurately avoid and mitigate collisions. The computer accounts for impact potential at the side of the target while still accounting for front-front impact prevention.

FIG. 1 illustrates an example system 100 for operating a vehicle 101 in an intersection. The system 100 includes a computer 105. The computer 105, typically included in a vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
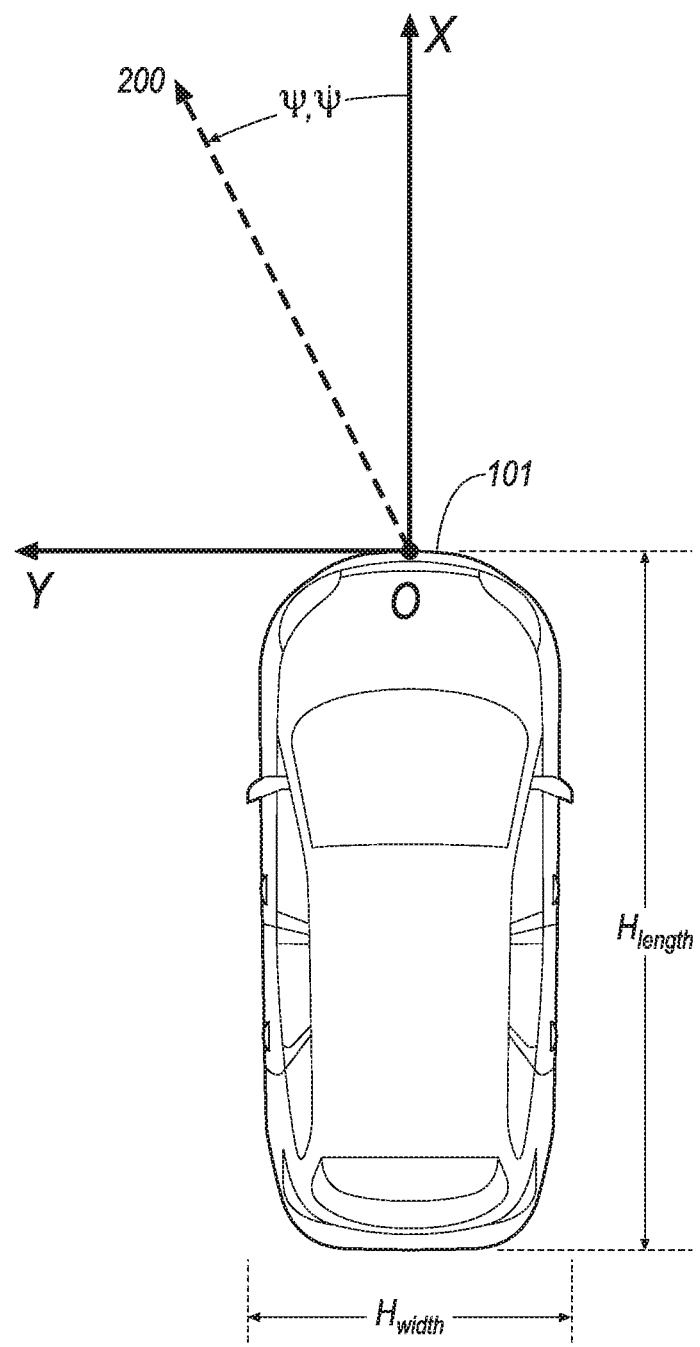
FIG. 2 is a view of an example host vehicle.

FIG. 2 illustrates an example host vehicle 101. The computer 105 in the vehicle 101 defines a coordinate system, e.g., a two-dimensional rectangular coordinate system. The coordinate system defines a longitudinal direction X and a lateral direction Y and an origin at a point O on a center point of a front bumper of the host vehicle 101. The longitudinal direction X is a vehicle-forward direction, i.e., the direction in which a propulsion 120 moves the vehicle 101 when a steering component 120 is at a neutral position. The lateral direction Y is perpendicular to the longitudinal direction X. The host vehicle 101 has a length $H_{length}$, i.e., a distance measure of the host vehicle 101 in the longitudinal direction X, and a width $H_{width}$, i.e., a distance measure of the host vehicle 101 in the lateral direction Y.

The computer 105 can determine a speed V and an acceleration a for each of the host vehicle 101 and the target 300. The speed V is the vector change in position in the coordinate system and can be subdivided into $V_{long}$, i.e., the speed in the longitudinal direction X, and $V_{lat}$, i.e., the speed in the lateral direction Y. The acceleration a is the time rate of change of the speed V, and can be subdivided into along, i.e., the acceleration in the longitudinal direction X, and $a_{lat}$, i.e., the acceleration in the lateral direction Y. The computer 105 can determine the speed V and the acceleration a based on data 115 collected from the sensors 110.

The computer 105 can determine a yaw angle $\psi$ and a yaw rate $\dot\psi$ for the host vehicle 101. The yaw angle $\psi$ is the angle defined between the trajectory 200 of the host vehicle 101 and the longitudinal axis X. That is, the yaw angle $\psi$ and yaw rate $\dot\psi$ represent motion of the host vehicle 101 in a turn.

Figure 3:
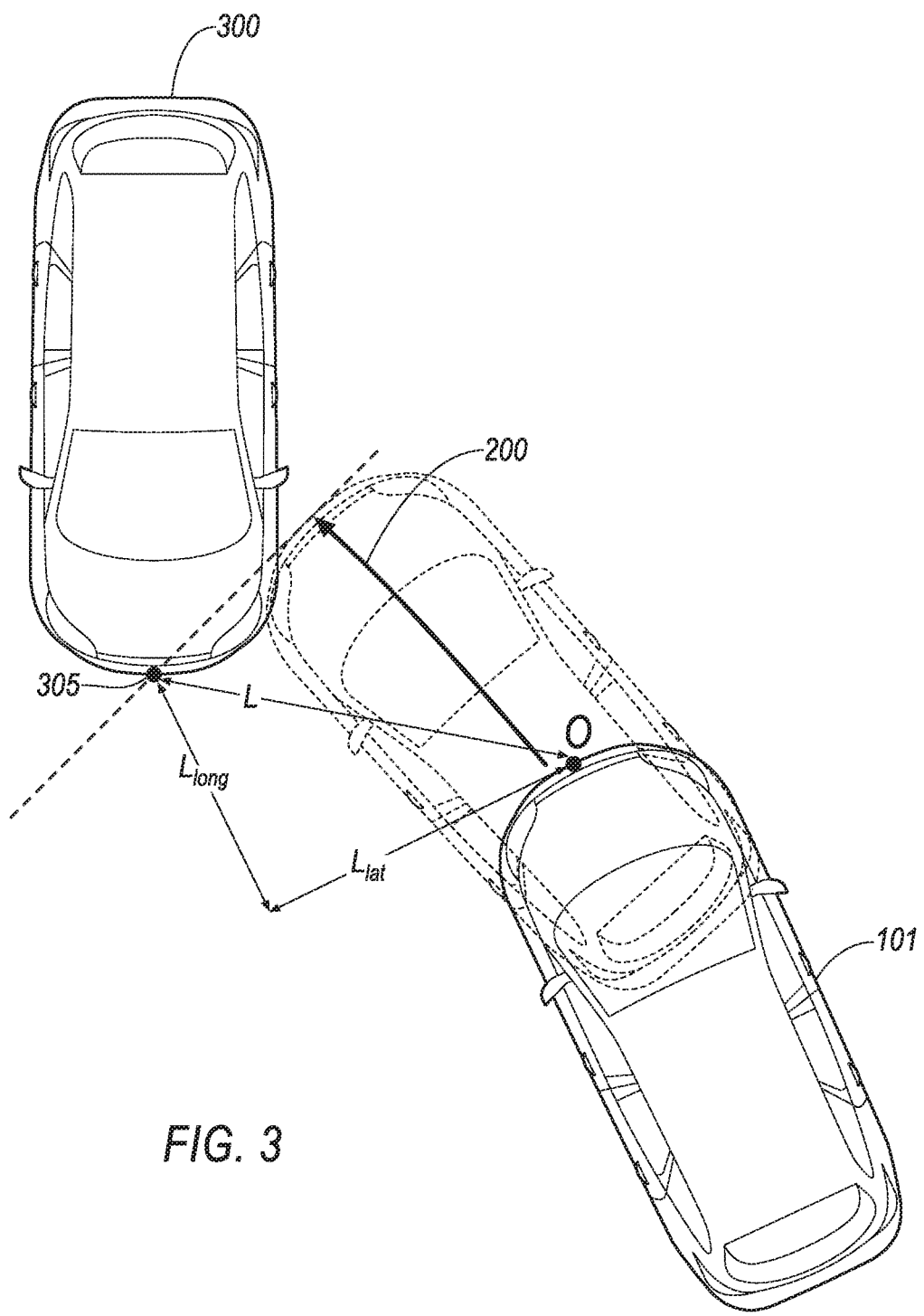
FIG. 3 is a view of the example host vehicle interacting with an example target.

FIG. 3 illustrates the host vehicle 101 and a target 300 in an intersection. As used herein an "intersection" is defined as a location where two or more vehicles' current or potential future trajectories cross. Thus, an intersection could be at any location on a surface where two or more vehicles could collide, e.g. a road, a driveway, a parking lot, an entrance to a public road, driving paths, etc. Accordingly, an intersection is determined by identifying an area where two or more vehicles may meet, i.e., collide. The size of the area defining the intersection can be specified to encompass an area in which collisions may occur, e.g., based on a number of roadway lanes, a roadway lane size, a vehicle size, location data of prior collisions, etc. For example, the intersection can encompass 400 $m^2$ to account for the meeting of two adjacent roadway lanes and two transverse roadway lanes. Such determination uses potential future trajectories of a host vehicle 101 as well as nearby other vehicles and/or other objects.

The host vehicle 101 can perform a "turn." As used herein, a "turn" is a path along which the host vehicle 101 travels from a current roadway lane to a transverse roadway lane. For example, the host vehicle 101 can perform a turn into a roadway lane perpendicular to a current roadway lane, i.e., a left turn or a right turn. As the host vehicle 101 performs a turn, the host vehicle 101 may collide with the target 300. For example, in an OnComing Turn-Across Path (OCTAP) scenario, the host vehicle 101 turns across a predicted path of the target 300 in an adjacent roadway lane. FIG. 3 illustrates an example front-side collision, i.e., the predicted trajectory 200 of the host vehicle 101 means a prediction that a front end of the host vehicle 101 will collide with a side of the target 300.

As used herein, the subscript "h" refers to the host vehicle 101, and the subscript "tg" refers to the target 300. For example, $V_h$ is the speed of the host vehicle 101 and $V_{tg}$ is the speed of the target 300.

To determine a likelihood of a collision between the host vehicle 101 and the target 300, the computer 105 can determine a "threat number" for the target. As used herein, a "threat number" is a scalar value between 0 and 1 that the computer 105 can use to determine whether a specific target 300 will intersect or collide with the host vehicle 101. Specifically, the computer 105 may determine the acceleration threat number ATN, the brake threat number BTN, and the steering threat number STN for the host vehicle 101 and the target 300, and based on the threat numbers ATN, BTN, STN, which may be combined into a single overall threat number TN, actuate components 120 of the host vehicle 101.

The BTN is a measure of a needed longitudinal deceleration to allow the host vehicle 101 to stop or reduce speed before colliding with the target 300. The BTN can be based on a measured host vehicle 101 speed, a distance between the target 300 and the host vehicle 101, and the respective projected trajectories of the target 300 and the host vehicle 101. The computer 105 can determine a longitudinal deceleration to stop or reduce speed of the host vehicle 101 before colliding with the target 300, e.g., 2 $m/s^2$. The computer 105 can determine a maximum deceleration of the host vehicle 101, e.g., 8 $m/s^2$. The BTN can be the ratio of the needed deceleration to the maximum deceleration, e.g., BTN=2/8=0.25. If the needed deceleration to avoid a collision with the target 300 exceeds the maximum deceleration of the host vehicle 101, i.e., BTN>1, then the computer 105 can set the value of the BTN to 1, i.e., if BTN>1, BTN=1.

The STN is a measure of a needed lateral acceleration to allow the host vehicle 101 to steer away from the target 200. As with the BTN, the computer 105 can determine a needed lateral acceleration to avoid a collision between the host vehicle 101 and the target 300. The STN can be the ratio of the needed lateral acceleration to a maximum lateral acceleration of the host vehicle 101. If the needed lateral acceleration exceeds the maximum lateral acceleration, the computer 105 can set the STN to 1.

The ATN is a measure of a needed longitudinal acceleration to allow the host vehicle 101 to accelerate and pass the target 300. As described above for the BTN and the STN, the computer 105 can determine a needed acceleration to allow the host vehicle 101 to pass the target 300 and a maximum available acceleration of the host vehicle 101. The ATN can be the ratio of the needed longitudinal acceleration to the maximum longitudinal acceleration of the host vehicle 101. If the needed longitudinal acceleration exceeds a maximum longitudinal acceleration, the computer 105 can set the ATN to 1. The computer 105 may determine the STN, BTN, and/or ATN to produce a respective overall threat number TN for the target 300.

The computer 105 can actuate one or more vehicle components 120 based on one of the threat numbers exceeding a predetermined threat threshold. The threat threshold can be determined based on, e.g., empirical testing of vehicles 101 in intersections, simulation modeling of vehicles 101, brake capacity, steering limits, etc. For example, if the overall threat number TN is above a threat threshold of 0.7, the computer 105 can actuate a brake 120 to decelerate the host vehicle 101, e.g., to −6.5 meters per second squared ($m/s^2$). In another example, if the threat number is above 0.4 but less than or equal to 0.7, the computer 105 can actuate the brake 120 to, e.g., a deceleration of −2.0 $m/s^2$. In another example, if the threat number is greater than 0.2 but less than or equal to 0.4, the computer 105 can display a visual warning on a vehicle 101 HMI and/or play an audio warning over a speaker.

The computer 105 can determine the threat number based on a specific position or location in the coordinate system representing a point on the exterior surface of the target 300. That is, the threat number predicts a probability or likelihood that the host vehicle 101 will collide with a specific point on the target 300. As shown in FIG. 3, the specific point may be a front point 305, i.e., a coordinate point representing a portion of a front bumper of the target 300. The computer 105 thus determines a "front threat number," i.e., a prediction of whether the host vehicle 101 will collide with the front point 305 of the target 300. The computer 105 can determine the front point 305 based on data 115 collected by the sensors 110 detecting the target 300. For example, the front point 305 may be a center point of the front bumper of the target 300, as shown in FIG. 3. When the front threat number exceeds a front threat threshold, determined based on, e.g., empirical impact tests, impact simulations, etc., the computer 105 can actuate one or more components 120 to avoid and/or mitigate a collision with the target 300.

The computer 105 can determine a rear point 310 of the target 300, i.e., a coordinate point representing a portion of a rear bumper of the target 300. For example, the rear point 310 may be a corner of the rear bumper of the target 300 closest to the host vehicle 101. The computer 105 can determine a "rear threat number" $TN_{rear}$, i.e., a prediction of whether the host vehicle 101 will collide with the rear point 310 of the target 300. For example, the rear threat number $TN_{rear}$ can be a rear brake threat number $BTN_{rear}$, i.e., a brake threat number based on the rear point 310 of the target 300. The computer 105 can determine the rear point 310 based on data 115 collected by the sensors 110 detecting the target 300. The computer 105 can determine the rear threat number $TN_{rear}$ upon determining that the front threat number $TN_{front}$ exceeds the front threat threshold. When the rear threat number exceeds a rear threat threshold, determined based on, e.g., empirical impact tests, impact simulations, etc., the computer 105 can actuate one or more components 120 to avoid and/or mitigate a collision with the target 300.

The computer 105 can determine a relative distance L between the host vehicle 101 and the target 300. The "relative distance" is the straight-line distance between a predetermined point on the host vehicle 101 and a predetermined point on the target 300. The predetermined point on the host vehicle 101 can be the origin O of the coordinate system. The predetermined point on the target 300 can be the front point 305, the rear point 310, or another point for which the computer 105 determines to calculate the relative distance L. For example, the relative distance L between the origin O of the host vehicle 101 and the front point 305 of the target 300 can be a "front distance" $L_{front}$. In another example, the relative distance L between the origin O of the host vehicle 101 and the rear point 310 of the target 300 can be a "rear distance" $L_{rear}$. The computer 105 can further decompose the relative distance L into a "longitudinal distance" $L_{long}$, i.e., a relative distance in the longitudinal direction, and a "lateral distance" $L_{lat}$, i.e., a relative distance in the lateral direction.

The computer 105 can determine a rear longitudinal distance $L_{rear,long}$ at a time period T after a current time t according to a fourth-order polynomial Taylor expansion of kinematic equations of the host vehicle 101 and the target 300 as follows:

$$L_{rear,long}(t+T) = \\ L_{rear,long}(t) + \frac{a_{long,h}(t)\dot{\psi}_h(t)^2 T^4}{8} + \frac{V_{long,h}(t)\dot{\psi}_h(t)^2 T^3}{6} + \\ \frac{1}{2}(a_{long,tg}(t) - a_{long,h}(t))T^2 + (V_{long,tg}(t) - V_{long,h}(t))T \quad (1)$$

where $a_{long,h}$ is the longitudinal acceleration of the host vehicle 101, $a_{long,tg}$ is the longitudinal acceleration of the target 300, $V_{long,h}$ is the longitudinal speed of the host vehicle 101, $V_{long,tg}$ is the longitudinal speed of the target 300, and $\dot{\psi}_h$ is the yaw rate of the host vehicle 101.

The computer 105 can determine a rear lateral distance $L_{rear,lat}$ at a time period T after a current time t according to a fourth-order polynomial Taylor expansion of kinematic equations of the host vehicle 101 and the target 300 as follows:

$$L_{rear,long}(t+T) = L_{rear,lat}(t) - \frac{V_{long,h}(t)\dot{\psi}_h(t)^3 T^4}{24} + \frac{a_{long,h}(t)\dot{\psi}_h(t)T^3}{3} + \\ \frac{1}{2}(a_{lat,tg}(t) - a_{lat,h}(t))T^2 + (V_{lat,tg}(t) - V_{lat,h}(t))T \quad (2)$$

where $a_{lat,h}$ is the lateral acceleration of the host vehicle 101, $a_{lat,tg}$ is the lateral acceleration of the target 300, $V_{lat,h}$ is the lateral speed of the host vehicle 101, and $V_{lat,tg}$ is the lateral speed of the target 300.

Figure 4:
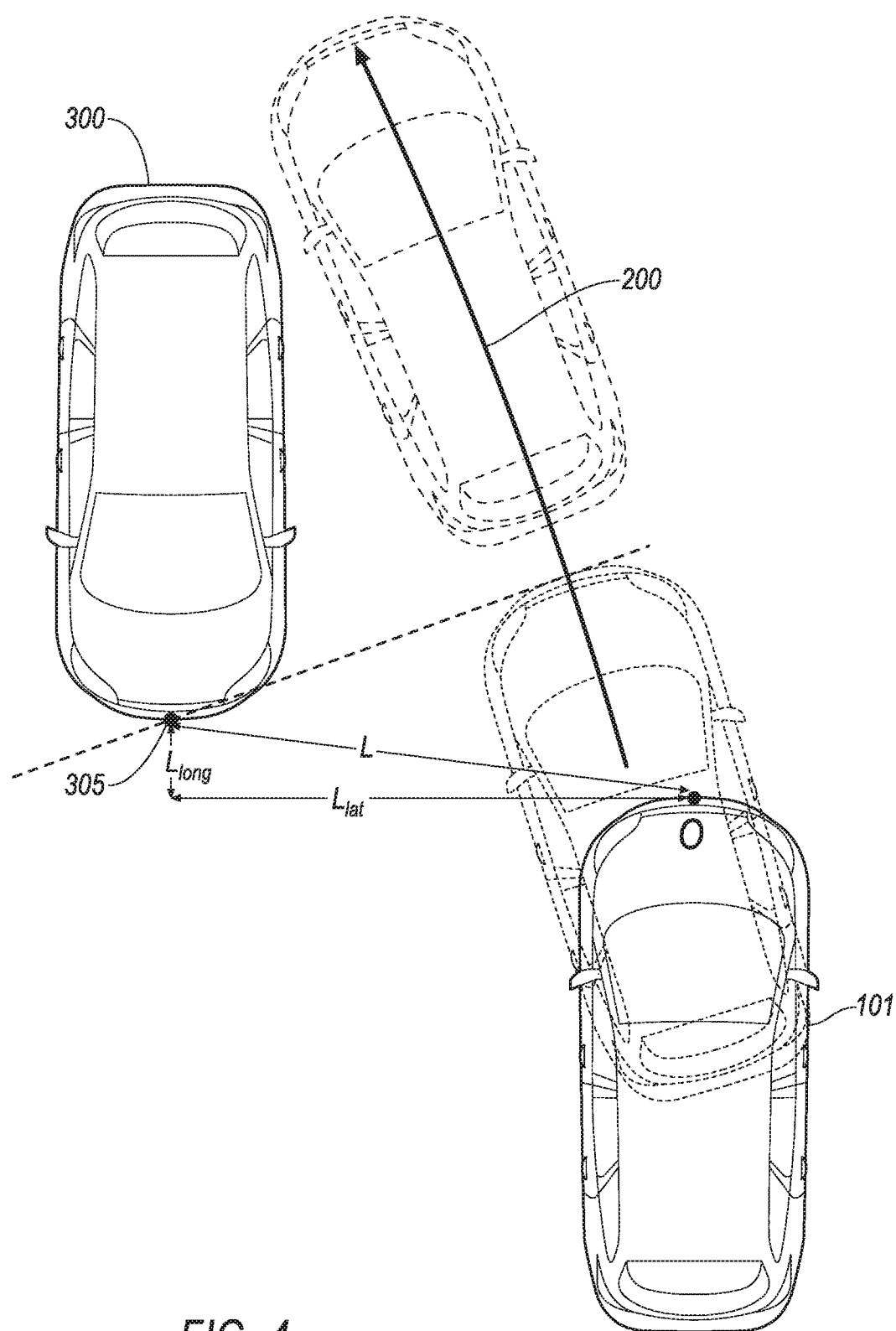
FIG. 4 is a view of the example host vehicle missing the example target.

FIG. 4 illustrates a "near miss" scenario for the host vehicle 101 and the target 300. As used herein, a "near miss" is when the front threat number is above a front threat threshold and the rear threat number is below a rear threat threshold. As described above, the computer 105 can determine the rear threat number upon determining that the front threat number exceeds the front threat threshold. The front threat threshold can be, e.g., 0.7. The rear threat threshold can be, e.g., 0.6. That is, the "near miss" occurs when the predicted trajectory 200 of the host vehicle 101 indicates that the host vehicle 101 would move behind the target 300 without colliding with the target 300 but the computer 105 determines, based on the front threat number alone, that a collision is likely. To prevent unnecessary braking during the near miss, the computer 105 determines the rear threat number and determines whether to brake the vehicle 101 based on the rear threat number. As described below, the computer 105 can determine, when the front threat number exceeds the front threat threshold, whether a collision with the rear point 310 is likely. Alternatively or additionally, the vehicle 101 can miss the target 300 while the computer 105 determines that a collision is likely when, e.g., the computer 105 detects only the rear point 310 of the target 300, the target 300 has a length between the front point 305 and the rear point 310 that is substantially shorter than a distance between the host vehicle 101 and the target 300, etc.

Figure 5:
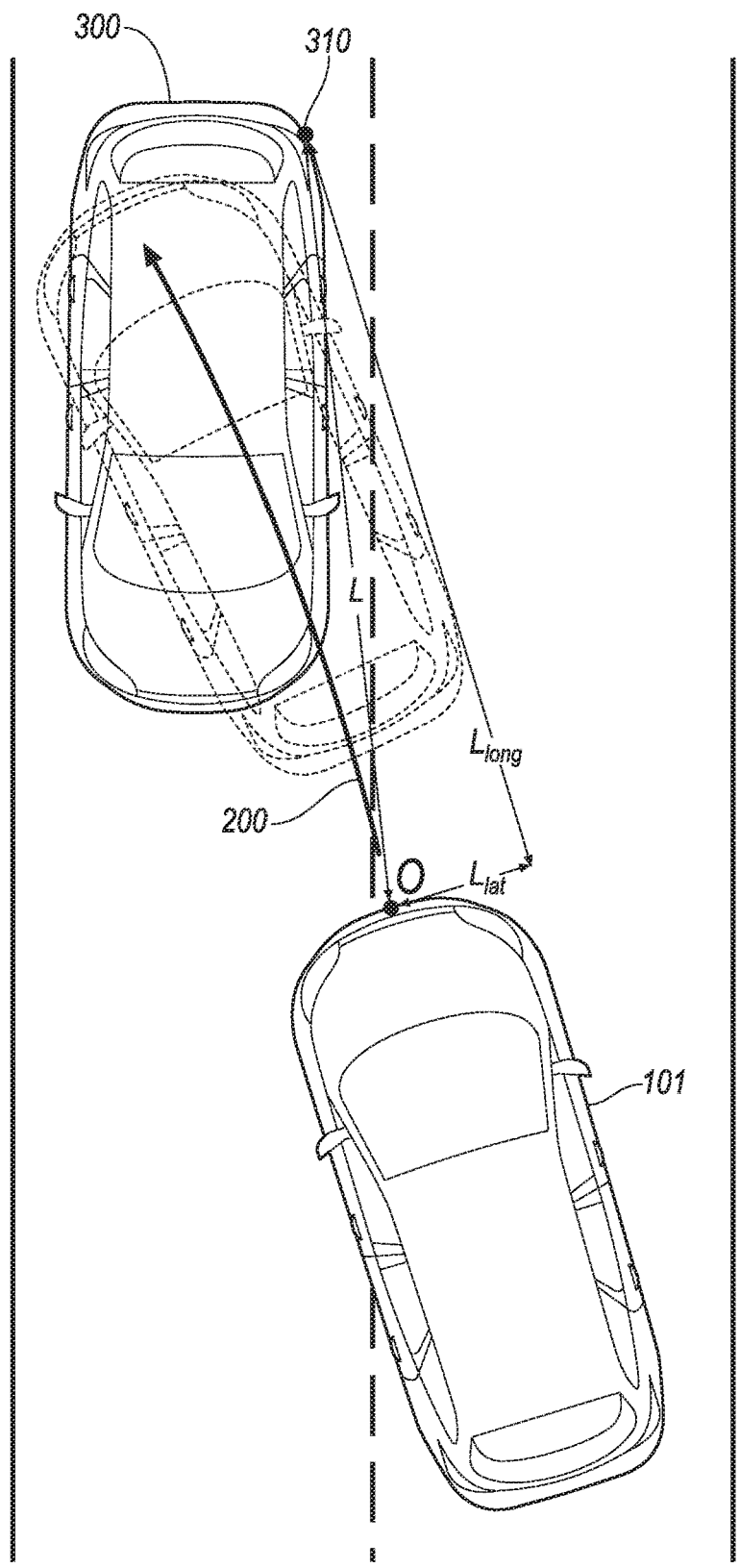
FIG. 5 is a view of the example host vehicle operating according to a rear point of the example target.

FIG. 5 illustrates the computer 105 detecting a side collision between the host vehicle 101 and the target 300 based on the rear point 310. As described above for FIGS. 3-4, during the turn, the computer 105 can determine, based on the front point 305 and the predicted trajectory 200, a front threat number indicating whether the host vehicle 101 is likely to collide with the target 300. To determine whether this front threat number indicates a false positive, the computer 105 can identify the rear point 310 of the target 300 and a rear threat number, e.g., a rear brake threat number $BTN_{rear}$, as described above. FIG. 5 illustrates that the rear threat number would indicate a collision, and the computer 105 can actuate components 120 to avoid and/or mitigate the collision.

Figure 6:
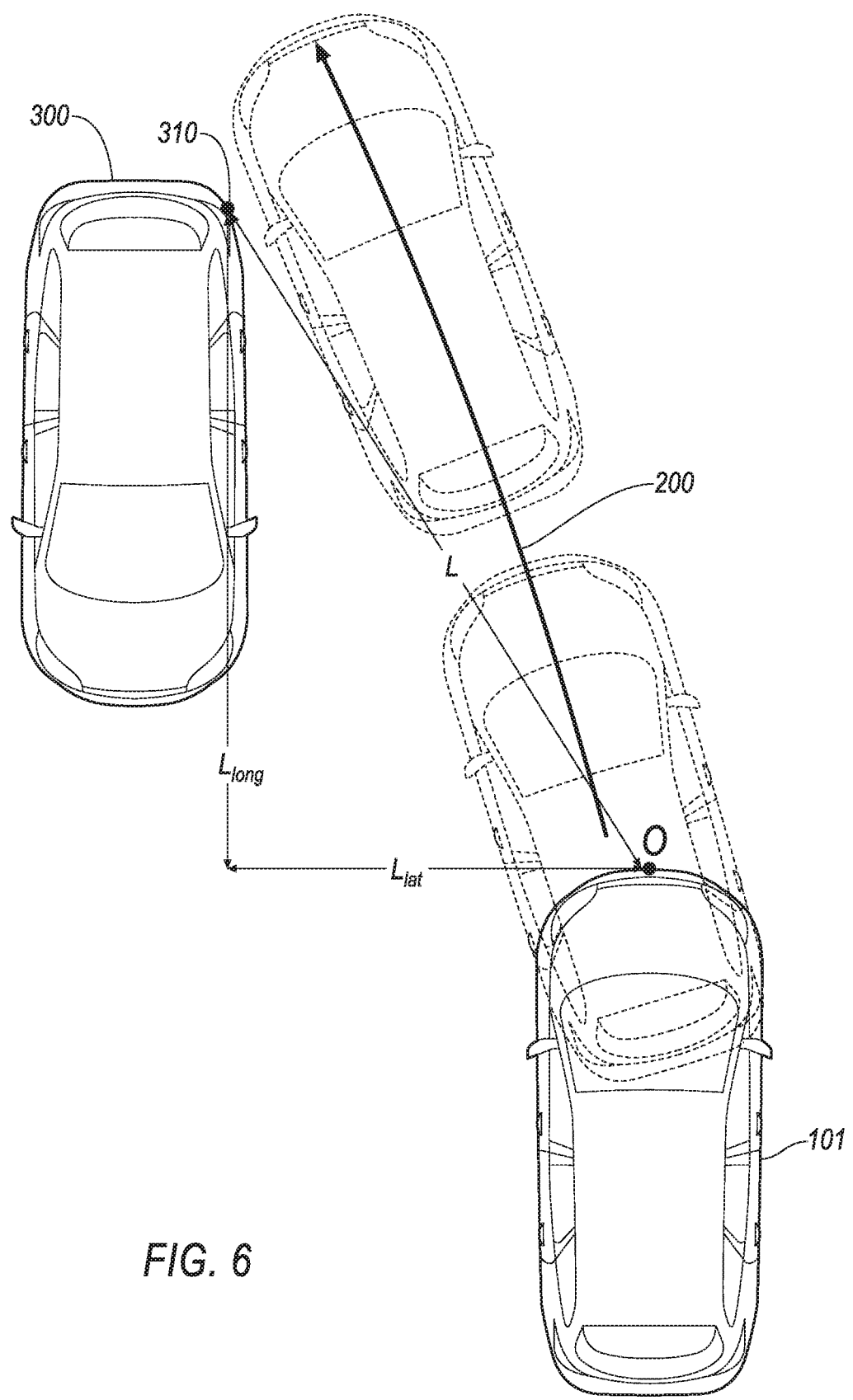
FIG. 6 is a view of the example host vehicle moving beyond the rear point of the example target.

FIG. 6 illustrates the computer 105 detecting a near miss between the host vehicle 101 and the target 300 based on the rear point 310. As described above, in a near miss scenario, the computer 105 determines a front threat number $TN_{front}$ that would indicate a likely collision with the target 300 but the predicted trajectory 200 of the host vehicle 101 would move the host vehicle 101 to pass the rear end of the target 300. That is, the near miss is a false positive indication of a collision with the target 300, and the computer 105 can prevent collision mitigation and avoidance to allow the host vehicle 101 to move past the target 300.

To adjust the overall threat number TN based on data 115 collected about the rear point 310, the computer 105 can determine a threat multiplier. As described below, the computer 105 can determine the threat multiplier based on the front threat number $TN_{front}$ and the rear threat number $TN_{rear}$. As used herein, the "threat multiplier" is a numerical value that is multiplied to the front threat number $TN_{front}$ to determine the overall threat number TN. For example, the threat multiplier may be 0 (e.g., in a near miss) to indicate that the host vehicle 101 is not likely to collide with the target 300 even when the front threat number $TN_{front}$ indicates otherwise. Alternatively, the threat multiplier may be 1 (e.g., if a rear time to collision, as discussed below, is below a predetermined time threshold) to indicate that the host vehicle 101 is likely to collide with the target 300. Yet further alternatively, the threat multiplier may be a different number to account for the additional or lower risk of collision based on data 115 about the rear point 310 of the target 300, e.g., a number between 0 and 1. That is, the threat multiplier between 0 and 1 can adjust the overall threat number TN to more accurately assess the risk of collision, e.g., as described above, from decelerating at −6.5 m/s² to decelerating at −2.0 m/s².

When the front threat number $TN_{front}$ exceeds a predetermined threat threshold for the first time in a turn, the computer 105 can determine the rear brake threat number $BTN_{rear}$. When the front threat number is below the threat threshold, the computer 105 can determine that the host vehicle 101 is not likely to collide with the target 300 and can actuate components 120 to continue the vehicle 101 in the turn. When the front threat number exceeds the threat threshold for a first time upon initiating the turn, either the host vehicle 101 will collide with the target 300 or the host vehicle 101 will pass by the rear end of the target 300 (i.e., a false positive "near miss" scenario"). Thus, the computer 105 can determine the rear time to collision $TTC_{rear,long}$, the rear lateral distance $L_{rear,lat}$, and/or the rear brake threat number $BTN_{rear}$ to determine whether the host vehicle 101 is at risk of colliding with the target 300. After determining that the front threat number exceeds the threat threshold for the first time upon initiating the turn, the computer 105 can refer to the previously determined overall threat number until completing the turn. After completing the turn, the computer 105 can reset the overall threat number until a subsequent turn.

The computer 105 can determine a rear longitudinal time to collision $TTC_{rear,long}$. The rear longitudinal time to collision $TTC_{rear,long}$ is the predicted time, based on the current vehicle 101 and target speeds V, for the host vehicle 101 to reach the rear point 310. The computer 105 can determine the rear longitudinal time to collision $TTC_{rear,long}$ as the time T at which the rear relative longitudinal distance $L_{rear,long}$=0, i.e., solving Equation 1 for $TTC_{rear,long}$:

$$0 = L_{rear,long}(t) + \frac{a_{long,h}\dot{\psi}_h(t)^2 TTC_{rear,long}^4}{8} + \frac{V_{long,h}(t)\dot{\psi}_h(t)^2 TTC_{rear,long}^3}{6} + \frac{1}{2}(a_{long,tg}(t) - a_{long,h}(t))TTC_{rear,long}^2 + (V_{long,tg}(t) - V_{long,h}(t))TTC_{rear,long} \quad (3)$$

The computer 105 can use conventional techniques to solve Equation 3, e.g., root-finding algorithms, Newton's method, the quartic formula, etc.

The computer 105 can determine whether the rear time to collision $TTC_{rear,long}$ is less than a time threshold. The time threshold can be based on, e.g., a brake response time, simulations of collisions in intersections, resolution tolerances in data 115 collection by the sensors 110, etc. For example, the time threshold can be greater than the brake response time by at least one or more resolution tolerances in data 115 collection to allow the computer 105 enough time to actuate the brake 120 to avoid and/or mitigate the collision. The time threshold can be, e.g., 0.8 seconds. If the rear time to collision $TTC_{rear,long}$ is less than the time threshold, the computer 105 can determine to operate according to the front threat number $TN_{front}$. If the rear time to collision $TTC_{rear,long}$ is less than a time threshold, the computer 105 can set the threat multiplier to 1.

The computer 105 can determine a rear lateral distance threshold for the host vehicle 101. The rear lateral distance threshold can be, e.g., a lateral distance between the origin O of the host vehicle 101 and an edge of the host vehicle 101, and the rear lateral distance threshold can be determined such that the rear point 310 is beyond the edge of the host vehicle 101 by at least a safety margin, described below, when the rear lateral distance $L_{rear,lat}$ exceeds the rear lateral distance threshold. As shown in FIGS. 5-6, the host vehicle 101 passes the target vehicle 300 when:

$$L_{rear,lat}(t + TTC_{rear,long}) < -\frac{H_{width}}{2} + C_{rear,lat} \quad (4)$$

where $$-\frac{H_{width}}{2}$$

is the coordinate in the lateral direction Y indicating the right side of the host vehicle 101, i.e., indicating that the vehicle 101 avoids the rear point 310. Because the origin of the coordinate system used in the equations is at the origin O at the center of the front bumper of the host vehicle 101, the rear end and right side of the host vehicle 101 have negative coordinates. That is, the coordinate in the longitudinal direction X at the rear end of the host vehicle 101 is 0, and the coordinate in the lateral direction Y at the right side of the host vehicle 101 is $$-\frac{H_{width}}{2}.$$

The rear lateral distance threshold can be, e.g., 1 meter. A safety margin $C_{rear,lat}$ can be determined to increase the rear lateral distance threshold above half the width $H_{width}$ of the host vehicle 101 to account for, e.g., tolerances in the Taylor series expansion, data collection from the sensors 110, and brake timing, etc. The computer 105 can determine whether the host vehicle 101 will collide with the target 300 based on the width of the host vehicle 101 and the safety margin $C_{rear,lat}$. The safety margin can be based on, e.g., simulation data of intersections and estimated resolution tolerances of the sensors 110. For example, the safety margin $C_{rear,lat}$ can be twice the resolution tolerance of the sensor 110 with the highest resolution tolerance to provide a safety factor of two. The safety margin $C_{rear,lat}$ allows the vehicle 101 to avoid the target 300 while accounting for potential variations in vehicle 101 operation.

The computer 105 can determine whether the rear lateral distance $L_{rear,lat}$ (t+$TTC_{rear,long}$) at the rear time to collision $TTC_{rear,long}$ is less than the rear lateral distance threshold. The computer 105 can, using Equations 2-3 above with the rear time to collision $TTC_{rear,long}$, determine the rear lateral distance $L_{rear,lat}$ (t+$TTC_{rear,long}$). If the rear lateral distance $L_{rear,lat}$ is less than the rear lateral distance threshold, the computer 105 can set the threat multiplier to 1.

The computer 105 can determine whether the rear brake threat number $BTN_{rear}$ is greater than a rear threat threshold. As described above, the rear brake threat number $BTN_{rear}$ is a measure of a needed longitudinal deceleration to allow the host vehicle 101 to stop or reduce speed prior to colliding with the target 300. The computer 105 can determine the rear brake threat number $BTN_{rear}$ as:

$$BTN_{rear} = \min\left(\frac{V_h(t)}{TTC_{rear,long}(t)} \cdot \frac{1}{a_{maxdecel,h}}, 1\right) \quad (5)$$

where $a_{maxdecel,h}$ is a maximum deceleration of the host vehicle 101. If the rear brake threat number $BTN_{rear}$ is greater than the rear threat threshold, as described above, the computer 105 can set the threat multiplier to 1.

If the rear threat number $TN_{rear}$ is below the rear threat threshold, i.e., none of threshold values described above are met, the computer 105 can set the threat multiplier to 0. That is, the computer 105 can determine that the scenario during the turn is a "near miss" and that the host vehicle 101 is not likely to collide with the target 300. As a result, the computer 105 can multiply the threat multiplier to the front threat number $TN_{front}$ to determine an overall threat number TN. When the overall threat number TN is $TN_{front}$, the computer 105 can actuate one or more components 120 in the turn to avoid the target 300. When the overall threat number TN is 0, the computer 105 can actuate the steering component 120 to complete the turn.

Figure 7:
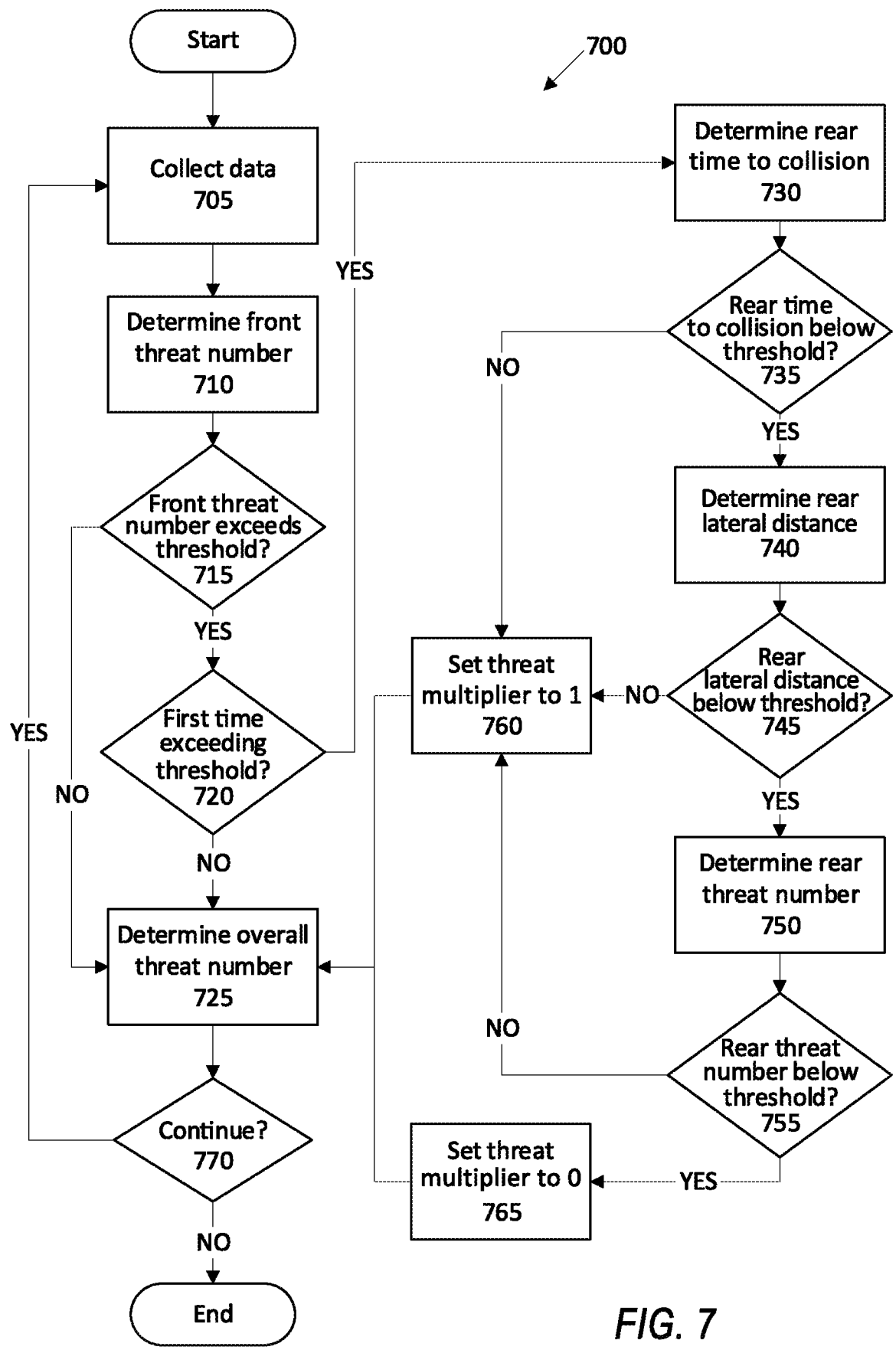
FIG. 7 is a block diagram of an example process for operating the host vehicle during a turn.

FIG. 7 is a block diagram of an example process 700 for operating a host vehicle 101 during a turn. The process 700 begins in a block 705, in which the computer 105 actuates one or more sensors 110 to collect data 115 about a target 300. The computer 105 can collect data 115 about, e.g., a target 300 speed, front point 305, rear point 310, acceleration, etc.

Next, in a block 710, the computer 105 can determine a front threat number $TN_{front}$. As described above, the front threat number $TN_{front}$ is a prediction of whether a specific target 300 will intersect or collide with the host vehicle 101 at the front point 305. The front threat number $TN_{front}$ can be the greatest of a determined brake threat number BTN, acceleration threat number ATN, and/or steering threat number STN, as described above.

Next, in a block 715, the computer 105 determines whether the front threat number $TN_{front}$ exceeds a predetermined threat threshold. As described above, when the front threat number $TN_{front}$ exceeds the predetermined threat threshold, the computer 105 can determine that the host vehicle 101 is likely to collide with the target 300. The threat threshold can be determined based on, e.g., empirical testing of vehicles 101 in intersections, simulation modeling of vehicles 101, brake capacity, steering limits, etc. The threat threshold can be a predetermined value determined by the computer 105 and/or the server 130 and stored in the data stores 106 and/or 135. For example, the server 130 can use acceleration data from a plurality of vehicles 101 to determine a maximum deceleration for the vehicles 101 and can determine the threat threshold based on the maximum deceleration. If the front threat number $TN_{front}$ exceeds the threat threshold, the process 700 continues in a block 720. Otherwise, the process 700 continues in a block 725.

In the block 720, the computer 105 determines whether the front threat number $TN_{front}$ has exceeded the threat threshold for the first time upon initiating the turn. That is, as described above, upon first determining that the front threat number $TN_{front}$ exceeds the threat threshold, the computer 105 can determine whether the likelihood of collision is a false positive, i.e., a near miss, or whether to actuate components 120 to avoid and/or mitigate a collision with the target 300. On subsequent determinations that the front threat number $TN_{front}$ exceeds the threat threshold in the turn, the computer 105 refers to the threat number determined upon first exceeding the threat threshold. If the computer 105 determines that the front threat number $TN_{front}$ has exceeded the threat threshold for the first time upon initiating the turn, the process 700 continues in a block 730. Otherwise, the process 700 continues in a block 725.

In the block 725, the computer 105 determines the overall threat number TN. As described above, the overall threat number TN can be, e.g., a previously determined threat number TN or the front threat number $TN_{front}$ multiplied by a threat multiplier. The threat multiplier adjusts the front threat number $TN_{front}$ based on information from the rear point 310. For example, if the computer 105 determines that the host vehicle 101 is in a near miss scenario, the computer 105 can set the threat multiplier to 0. Upon determining the overall threat number TN, the computer 105 can actuate one or more components 120 to avoid and/or mitigate a collision.

In the block 730, the computer 105 determines a rear time to collision $TTC_{rear,long}$. As described above, the rear time to collision $TTC_{rear,long}$ predicts a time elapsed until a relative rear longitudinal distance $L_{rear,long}$ reaches 0, i.e., the origin O at the center point of the front bumper of the host vehicle 101 has 0 longitudinal distance from the rear point 310.

Next, in a block 735, the computer 105 determines whether the rear time to collision $TTC_{rear,long}$ is below a predetermined time threshold. When the rear time to collision $TTC_{rear,long}$ is below the predetermined time threshold, the computer 105 can determine that the calculations to determine the rear time to collision $TTC_{long,rear}$ may be affected by, e.g., tolerance errors, rounding errors, errors from the Taylor series expansion, etc., and may indicate a near miss scenario. If the rear time to collision $TTC_{rear,long}$ is below the predetermined time threshold, the process 700 continues in a block 740. Otherwise, the process 700 continues in a block 760.

In the block 740, the computer 105 determines a rear lateral distance $L_{rear,lat}$ at the rear time to collision $TTC_{rear,long}$. The rear lateral distance $L_{rear,lat}$ is the lateral distance between the center O of the host vehicle 101 and the rear point 310 of the target 300.

Next, in a block 745, the computer 105 determines whether the rear lateral distance $L_{rear,lat}$ is below a predetermined rear lateral distance threshold. The rear lateral distance threshold can be, e.g., a lateral distance between the origin O at the center point of the front bumper of the host vehicle 101 and an edge of the host vehicle 101, and the rear lateral distance threshold can be determined such that the rear point 310 is beyond the edge of the host vehicle 101 when the rear lateral distance $L_{rear,lat}$ exceeds the rear lateral distance threshold. If the rear lateral distance $L_{rear,lat}$ is below the rear lateral distance threshold, the process 700 continues in a block 750. Otherwise, the process 700 continues in the block 760.

In the block 750, the computer 105 determines a rear threat number $TN_{rear}$. For example, the computer 105 can determine a rear brake threat number $BTN_{rear}$, as described above. The rear brake threat number $BTN_{rear}$ can be a measure of a change in longitudinal acceleration to allow one of the host vehicle 101 to stop or the rear point 310 of the target 300 to pass the host vehicle 101.

Next, in a block 755, the computer 105 determines whether the rear threat number $TN_{rear}$ is below a predetermined rear threat threshold. As described above, the rear threat threshold can be determined based on, e.g., empirical testing of vehicles 101 in intersections, simulation modeling of vehicles 101, brake capacity, steering limits, etc. If the rear threat number $TN_{rear}$ is below the rear threat threshold, the process 700 continues in a block 765. Otherwise, the process 700 continues in the block 760.

In the block 760, the computer 105 assigns the threat multiplier to a value of 1. Because one of the rear time to collision $TTC_{rear,long}$, the rear lateral distance $L_{rear,lat}$, or the rear threat number $TN_{rear}$ indicates a likelihood of a collision (i.e., the scenario is not a near miss scenario), the computer 105 assigns the threat multiplier to 1 and actuates components 120 to avoid and/or mitigate the collision with the target 300. By setting the threat multiplier to 1, the computer 105 actuates components 120 according to the front threat number $TN_{front}$, e.g., specifying brake 120 actuation to achieve deceleration to avoid and/or mitigate the collision according to the front threat number $TN_{front}$. That is, the computer 105 determines that the risk of collision is the risk associated with the front threat number $TN_{front}$ and actuates components 120 according to that amount of risk.

In the block 765, the computer 105 assigns the threat multiplier to a value of 0. That is, the compute 105 determines that the host vehicle 101 is in a near miss scenario and will not likely collide with the target 300. The computer 105 can actuate a steering component 120 to complete the turn with the overall threat number TN set to 0. In the example process 700, the threat multiplier can be 0 or 1, but the threat multiplier can be a different number, e.g., a number between 0 and 1, to more finely assess the risk of collision and to provide more specific component 120 actuation to avoid and/or mitigate the collision.

Next, in a block 770, the computer 105 determines whether to continue the process 700. For example, if the host vehicle 101 is still in the turn, the computer 105 can determine to continue the process 700. In another example, if the host vehicle 101 has completed the turn, the computer can determine not to continue the process 700. If the computer 105 determines to continue, the process 700 returns to the block 705 to collect additional data 115. Otherwise, the process 700 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   determine a front threat number between a turning host vehicle and an oncoming target, the front threat number being a likelihood of a collision between the turning host vehicle and a front point of the oncoming target;
   upon determining the front threat number exceeds a threat threshold, determine a rear time to collision between the turning host vehicle and a rear point of the oncoming target based on a yaw rate of the turning host vehicle;
   upon determining that the rear time to collision is below a time threshold, determine a rear threat number for the oncoming target, the rear threat number being a likelihood of collision between the turning host vehicle and the rear point of the oncoming target; and
   actuate a component based on the rear threat number for the oncoming target.

2. The system of claim 1, wherein the instructions further include instructions to determine an overall threat number based on the rear threat number and the front threat number.

3. The system of claim 2, wherein the overall threat number is based on a threat multiplier that is based on the rear threat number.

4. The system of claim 3, wherein the instructions further include instructions to set the threat multiplier to zero when the rear threat number is below a rear threat threshold.

5. The system of claim 1, wherein the instructions further include instructions to determine the rear threat number when a predicted lateral distance from the host vehicle to a rear corner of the oncoming target is below a distance threshold.

6. The system of claim 1, wherein the instructions further include instructions to determine the rear time to collision when the front threat number exceeds the threat threshold for a first time in a turn.

7. The system of claim 1, wherein the rear threat number is a brake threat number.

8. The system of claim 1, wherein the instructions further include instructions to actuate a steering component to complete a turn when the rear threat number is below a rear threat threshold.

9. The system of claim 1, wherein the instructions further include instructions to determine the rear time to collision based on a predicted rear longitudinal distance.

10. A method, comprising:
determining a front threat number between a turning host vehicle and an oncoming target, the front threat number being a likelihood of a collision between the turning host vehicle and a front point of the oncoming target;
upon determining the front threat number exceeds a threat threshold, determining a rear time to collision between the turning host vehicle and a rear point of the oncoming target based on a yaw rate of the turning host vehicle;
upon determining that the rear time to collision is below a time threshold, determining a rear threat number for the oncoming target, the rear threat number being a likelihood of collision between the turning host vehicle and the rear point of the oncoming target; and
actuating a component based on the rear threat number for the oncoming target.

11. The method of claim 10, further comprising determining a threat multiplier based on the rear threat number.

12. The method of claim 11, further comprising setting the threat multiplier to 0 when the rear threat number is below a rear threat threshold.

13. The method of claim 10, further comprising determining the rear time to collision when the front threat number exceeds the threat threshold for a first time in a turn.

14. A system, comprising:
a brake;
a steering component;
means for determining a front threat number between a turning host vehicle and an oncoming target, the front threat number being a likelihood of a collision between the turning host vehicle and a front point of the oncoming target;
means for determining a rear time to collision between a turning host vehicle and an oncoming target based on a yaw rate of the turning host vehicle upon determining a front threat number exceeds a threat threshold;
means for determining a rear threat number for the oncoming target upon determining that the rear time to collision is below a time threshold, the rear threat number being a likelihood of collision between the turning host vehicle and the rear point of the oncoming target; and
means for actuating one of the brake or the steering component based on the rear threat number for the oncoming target.

15. The system of claim 14, further comprising means for determining a threat multiplier based on the rear threat number.

16. The system of claim 15, further comprising means for setting the threat multiplier to 0 when the rear threat number is below a rear threat threshold.

17. The system of claim 14, further comprising means for determining the rear time to collision when the front threat number exceeds the threat threshold for a first time in a turn.

* * * * *